United States Patent
Tuyls et al.

(10) Patent No.: US 8,583,936 B2
(45) Date of Patent: Nov. 12, 2013

(54) KEY GENERATION USING BIOMETRIC DATA AND SECRET EXTRACTION CODES

(75) Inventors: Pim Theo Tuyls, Eindhoven (NL); Jasper Johannes Adrianus Goseling, Lausanne (CH)

(73) Assignee: Koninklijke Philips N.V., Eindhoven (NL)

( * ) Notice: Subject to any disclaimer, the term of this patent is extended or adjusted under 35 U.S.C. 154(b) by 1416 days.

(21) Appl. No.: 11/722,443

(22) PCT Filed: Dec. 22, 2005

(86) PCT No.: PCT/IB2005/054376
§ 371 (c)(1), (2), (4) Date: Jun. 21, 2007

(87) PCT Pub. No.: WO2006/070322
PCT Pub. Date: Jul. 6, 2006

(65) Prior Publication Data
US 2010/0027784 A1    Feb. 4, 2010

(30) Foreign Application Priority Data
Dec. 28, 2004    (EP) .................................... 04107011

(51) Int. Cl.
| | |
|---|---|
| *G06F 21/00* | (2013.01) |
| *H04L 9/14* | (2006.01) |
| *G06F 21/32* | (2013.01) |
| *H04L 9/32* | (2006.01) |
| *H04L 29/06* | (2006.01) |

(52) U.S. Cl.
CPC . *G06F 21/32* (2013.01); *H04L 9/32* (2013.01); *H04L 63/0861* (2013.01); *H04L 9/3231* (2013.01); *H04L 9/3236* (2013.01)
USPC ........... 713/186; 382/115; 382/124; 382/125; 726/5

(58) Field of Classification Search
None
See application file for complete search history.

(56) References Cited

U.S. PATENT DOCUMENTS 5,680,460 A * 10/1997 Tomko et al. ................. 713/186
6,370,247 B1    4/2002 Takaragi et al.
(Continued)

FOREIGN PATENT DOCUMENTS

| | | |
|---|---|---|
| WO | WO2004104899 A2 | 12/2004 |
| WO | WO2007036822 A1 | 4/2007 |

OTHER PUBLICATIONS

Tuyls et al: "Capacity and Examples of Templates-Protecting Biometric Authentication Systems"; Biometric Authentication ECCV 2004 Intl. Workshop, BIOAW 2004, Proceedings (Lecture Notes in Computer Science, vol. 3087), May 12, 2004, pp. 158-170, XP002372511.

(Continued)

*Primary Examiner* — Ashok Patel
*Assistant Examiner* — Alexander Lagor

(57) ABSTRACT

A method of generating a key for encrypting communications between first and second terminals includes obtaining a measurement of characteristics of a physical identifier of a user; and extracting a key from the physical identifier using a code selected from a collection of codes. Each code in the collection defines an ordered mapping from a set of values of the characteristics to a set of keys. The collection of codes includes at least one code in which the ordered mapping is a permutation of the ordered mapping of one of the other codes in the collection.

13 Claims, 2 Drawing Sheets

(56) References Cited

U.S. PATENT DOCUMENTS

| | | | |
|---|---|---|---|
| 7,779,268 B2* | 8/2010 | Draper et al. | 713/186 |
| 7,996,683 B2* | 8/2011 | Lyseggen et al. | 713/186 |
| 2001/0021254 A1 | 9/2001 | Furuya et al. | |
| 2002/0101986 A1 | 8/2002 | Roelse | |
| 2003/0059054 A1 | 3/2003 | Hu et al. | |
| 2003/0154405 A1 | 8/2003 | Harrison | |
| 2003/0219121 A1 | 11/2003 | Van Someren | |
| 2004/0193893 A1* | 9/2004 | Braithwaite et al. | 713/186 |
| 2005/0152584 A1* | 7/2005 | Svedin | 382/124 |

OTHER PUBLICATIONS

Linnartz et al: "New Shielding Functions to Enhance Privacy and Prevent Misuse of Biometric Templates"; AVBPA 2003.

Csirmaz et al "Geometrical Cryptography"; Proc. of the Intl. Workshop on Coding and Cryptography, pp. 101-109, Versailees, France 2003.

\* cited by examiner

KEY GENERATION USING BIOMETRIC DATA AND SECRET EXTRACTION CODES

The present invention relates to the generation of keys for use in security systems, and in particular relates to the generation of keys from physical identifiers.

There is an increasing demand for more reliable and convenient security systems, and there is interest in the use of physical identifiers, such as fingerprints, iris, voice and gait Since physical identifiers cannot be lost or forgotten in the way that, for example, computer passwords can, they have the potential to offer higher security and more convenience to users.

A system that uses symmetric cryptographic keys derived from physical/biometric data is described below with reference to FIGS. 1 and 2.

Consider the situation that a user, Alice, wants to communicate over a private channel with another user, for example, her Bank. The protocol used by Alice and the Bank comprises two phases, the enrolment phase and the application phase.

FIG. 1 shows the system architecture required to carry out the enrolment phase. In the enrolment phase, a Certification Authority (CA) receives a measurement of Alice's biometrics $X^n$, over a secure channel and derives a secret S and, from this, cryptographic key F(S), as well as some helper data W. Such a method of deriving keys from physical identifiers is described in "New Shielding Functions to Enhance Privacy and Prevent Misuse of Biometric Templates" by J. P. Linnartz and P. Tuyls, AVBPA 2003. The helper data W and the cryptographic key F(S) are stored in a database of the bank. The helper data W is used during the application phase to allow a terminal to derive the same cryptographic key F(S) from a noisy measurement of Aice's biometrics, $Y^n$.

During the application phase, a noisy measurement $Y^n$ of Alice's biometrics is obtained at a terminal. Alice enters conventional user identity data, such as a user name, into the terminal, and the user identity data is sent to the Bank. The Bank accesses its database using this data and retrieves the helper data W associated with Alice. The helper data W is sent to Alice's terminal over a public authenticated channel. The helper data W together with the noisy measurement $Y^n$ of Alice's biometrics are used to derive a key F(V). F(S) and F(V) are then used to encrypt communications sent from the Bank to Alice and from Alice to the Bank respectively. As the system uses symmetric cryptographic keys, F(V) must equal F(S) in order for the encrypted communications to be decoded.

The convenience and security of this system in relation to classical systems comes from the fact that Alice is not required to store her cryptographic key, F(V), nor the helper data W. In the application phase Alice is only required to provide a measurement of her biometric identifier.

However, Alice may need to use her biometric data to establish secure communications with several parties, for example, the Bank and another user, Charlie. Therefore, Alice must be able to derive multiple cryptographic keys from her biometric data as it desirable that Charlie is not able to eavesdrop on the communications between Alice and the Bank. In addition, it is desirable to protect against the possibility that multiple parties use their respective cryptographic keys to collaborate in an attack on the secure channel between Alice and the Bank.

Such a system should have several characteristics. Firstly, the system should be robust, meaning that, given a noisy measurement $Y^n$ of a user's biometrics $X^n$, it should be possible to derive the correct key in the application phase, i.e. F(V)=F(S).

Secondly, the information in the database of the Bank (F(S) and W) should not reveal any sensitive information about $X^n$.

Thirdly, the helper data W that is sent over the public authenticated channel should not give any information about the cryptographic key F(S).

Fourthly, given a fixed biometric X' it should be possible to derive different pairs of F(S) and W.

In the following, the different pairs of keys and helper data are denoted $F(S_i)$ and $W_i$, where i=1, 2, . . . , K, where K>>1. The secrecy of a key F(S) should be guaranteed given the helper data $W_i$ and all of the other key/helper data pairs, $F(S_1)$, $W_1$; . . . ; $F(S_{i-1})$, $W_{i-1}$; $F(S_{i+1})$, $W_{i+1}$; . . . ; $F(S_K)$, $W_K$.

Several assumptions are also made about the security of the system. Firstly, the Certification Authority (CA), which carries out the enrolment phase, is trusted.

Secondly, the communication of the helper data W from the Bank to Alice during the application phase is over a public authenticated channel.

Thirdly, the parties that Alice communicates with cannot be trusted. Charlie, for example, might use his knowledge of $F(S_C)$ and $W_C$ to attack the secure channel between Alice and the Bank, i.e. he will try to find $F(S_B)$.

Fourthly, several parties can collaborate to attack one of Alice's secure channels with another user.

Fifthly, an attacker that does not share a secure channel with Alice can steal cryptographic keys and helper data from one or more of the parties who share a secure channel with Alice. In particular he has access to $F(S_i)$, $W_i$.

Sixthly, the sensor and processing devices in the terminal that Alice uses during the application phase are tamper resistant.

Finally, an attacker is not able to obtain latent biometrics. The only information can come from information in the databases.

Biometric templates are processed measurement data, i.e. feature vectors, and are modelled as realizations of a random process. Biometrics of different individuals are independent realizations of a random process that is equal for all individuals. The processing of biometrics results in templates that can be described by n independent identically distributed (i.i.d) random variables with a known distribution $P_X$. The probability that the biometric sequence $X^n$ of a certain individual equals $x^n$ is defined by $$Pr\{X^n = x^n\} = \prod_{i=1}^{n} P_X(x_i), \tag{1}$$

where $P_X$ is the probability distribution of each component, defined on an alphabet $\mathfrak{R}$, which can be a discrete set or $\mathfrak{R}$ (for X=$\mathcal{X}$ the sequence $X^n$ is characterised by the probability density function $f_{x^n}(x^n) = \Pi_i f_X(x_i)$)

Noisy measurements made during the application phase are modelled as observations of biometrics through a memoryless noisy channel. For a measurement $Y^n$ of biometrics $x^n$:

$$Pr\{Y^n = y^n \mid X^n = x^n\} = \prod_{i=1}^{n} P_{Y|X}(y_i|x_i), \tag{2}$$

where $P_{Y|X}$ characterizes the memoryless channel with input alphabet $\mathcal{Y}$ and output alphabet $\mathcal{X}$ The biometric templates obtained by the certification authority are noise free.

In order to deal with noisy measurements, Secret Extraction Codes (SECs) can be used. Secret Extraction Codes are described in "Capacity and Examples of Template-Protecting Biometric Authentication Systems" by Pim Tuyls and Jasper Goseling (available from "eprint.iacr.org/2004/106.pdf"), but will also be described below.

S denotes the set of secrets and $\mathcal{X}$ and $\mathcal{Y}$ denote the input and output alphabets respectively of the channel representing the noisy measurements.

Let n, $\epsilon>0$. An (n, |S|, c) Secret Extraction Code C, defined on $\mathcal{X}^n \times \mathcal{Y}^n$, is an ordered set of pairs of encoding and decoding regions $$C=\{(\epsilon_i, \mathcal{D}_i)|i=1, 2, \ldots, |S|\}, \qquad (3)$$

where $\epsilon_i \subset \mathcal{X}^n$ and $\mathcal{D}_i \subseteq \mathcal{Y}^n$, such that $$\mathcal{E}_i \cap \mathcal{E}_j = \emptyset, \mathcal{D}_i \cap \mathcal{D}_j = \emptyset, \bigcup_i \mathcal{D}_i = \Upsilon^n \qquad (4)$$

for i, j=1, 2, ..., |S|, i≠j and $$P_{Y^n|X^n}(D_i|X_i^n) \geq 1-\epsilon, \qquad (5)$$

for all $x_i^n \in \epsilon_i$ and i=1, 2, ..., |S|.

A secret extraction code provides an encoding-decoding scheme of a (possibly continuous) variable into a finite alphabet S={1, 2, ..., |S|} by discretization. The condition in Eq. (4) expresses that unambiguous encoding and decoding is possible and the condition of Eq. (5) implies a low probability of error.

When the sets $\epsilon_i$ have cardinality one, the SECs are normal error correcting codes.

To determine the cryptographic keys from the secret extraction codes, the following are defined:

$\mathcal{X}^n$ and $\mathcal{Y}^n$, the measurement alphabets of biometrics during the enrolment and the application phase, respectively a one-way hash function F:S $\mapsto$ $\mathcal{K}$, with S={1, 2, ..., |S|} and $\mathcal{K}$={1, 2, ..., |$\mathcal{K}$|}.

The size of S and $\mathcal{K}$ is large enough such that given F(S), it is computationally infeasible to find S for $x^n \in \mathcal{X}^n$, define $_{x^n} \subset C$. A secret extraction code C={$(\epsilon_1, \mathcal{D}_1)\}_{i=1}^{|S|} \in \Phi_{x^n}$ iff $\overline{x^n \in U}_i \epsilon_i$ a finite collection C of(n, |S|, $\epsilon$) secret extraction codes on $\mathcal{X}^n \times \mathcal{Y}^n$, where $\epsilon>0$.

The following procedure is used during the enrolment phase:
1. The biometrics $\mathcal{X}^n$ of Alice are measured
2. A secret extraction code C is chosen at random in $\Phi_{x^n}$. Helper data W is defined as the index of this secret extraction code C. If $\Phi_{x^n}=\emptyset$, a secret extraction code is selected at random from C.
3. Given a C={$(E_i, \mathcal{D}_i)\}_{i=1}^{|S|}$, the secret S is defined as S=i if $\mathcal{X}^n \in \epsilon_i$.
For $\Phi_{x^n}=\emptyset$, S is chosen at random.
4. F(S) and W are provided to the Bank.

The following procedure is used during the application phase:
1. The Bank sends the helper data W to Alice over a public authenticated channel.
2. Alice obtains a measurement $Y^n$ of her biometrics.
3. The secret extraction code C(W) is used to derive the secret V=i if $Y^n \in \mathcal{D}_i$, and hence the key F(V).
4. Alice and the Bank use a symmetric cryptosystem based on the keys F(V) and F(S), respectively.

As mentioned above, if Alice uses a symmetric cryptosystem to communicate securely with different parties, it is desirable that she does not use the same key in more than one place.

If C is a collection of SECs, and $x^n \in \mathcal{X}^n$ is the biometric template of Alice, then if there is only one secret extraction code in the collection available for use with a particular biometric (i.e. $|\Phi_{x^n}|=1$), then clearly only one cryptographic key can be derived from $x^n$. A collection C for which there are a large number of $x^n \in \mathcal{X}^n$ for which $|\Phi_{x_n}|$ is small cannot be used reliably by users for the extraction of multiple cryptographic keys.

Therefore, it is an object of the present invention to provide an extended set of secret extraction codes for use in extracting cryptographic keys from a particular biometric identifier.

According to a first aspect of the present invention, there is provided a method of generating a key for encrypting communications between first and second terminals, the method comprising: obtaining a measurement of characteristics of a physical identifier of a user; and extracting a key from the physical identifier using a code selected from a collection of codes, each code in the collection defining an ordered mapping from a set of values of the characteristics to a set of keys; wherein the collection of codes comprises at least one code in which the ordered mapping is a permutation of the ordered mapping of one of the other codes in the collection.

The invention will now be described, by way of example only, with reference to the following drawings, in which.

In the following, the invention will be described with reference to the use of secret extraction codes and biometric identifiers. However, it will be appreciated by a person skilled in the art that the invention can be applied to systems in which keys are derived using other methods, and from any type of physical identifier.

As mentioned above, where there is only one secret extraction code from the collection available for use with a particular biometric (i.e. if $|\Phi_{x^n}|=1$), then only one cryptographic key can be derived from $x^n$. A collection C in which there are a large number of biometric identifiers $x^n \in \mathcal{X}^n$ where the number of secret extraction codes ($|\Phi_{x^n}|$) is small cannot be reliably used for the extraction of multiple cryptographic keys.

Therefore, the present invention provides a method of generating a key for encrypting communications between first and second terminals in which the collection of SECs used for key extraction has been extended. In particular, assume that $|\Phi_{x^n}|=1$ for all $x^n \in \mathcal{X}^n$. The method according to the invention adds SECs to C such that $|\Phi_{x^n}|>1$ for all $x^n \in \mathcal{X}^n$.

In preferred embodiments of the invention, the method achieves $|\Phi_{x^n}|=|S|$ for all $x^n \in \mathcal{X}^n$. In preferred embodiments of the invention, the collection of secret extraction codes is extended by adding permuted versions of the existing secret extraction codes.

Specifically, the secret extraction codes are ordered sets of encoding/decoding region pairs. That is, the secret extraction codes relate a set of values of characteristics of a physical identifier to a set of keys. The ordering of the set of values and set of keys in the secret extraction code implies a mapping from "regions" (a region being a particular set of values of characteristics of the physical identifier) to keys. The present invention extends this collection by adding secret extraction codes that have the same "regions" as the original secret extraction codes in the collection but with a different mapping to keys.

Figure 1:
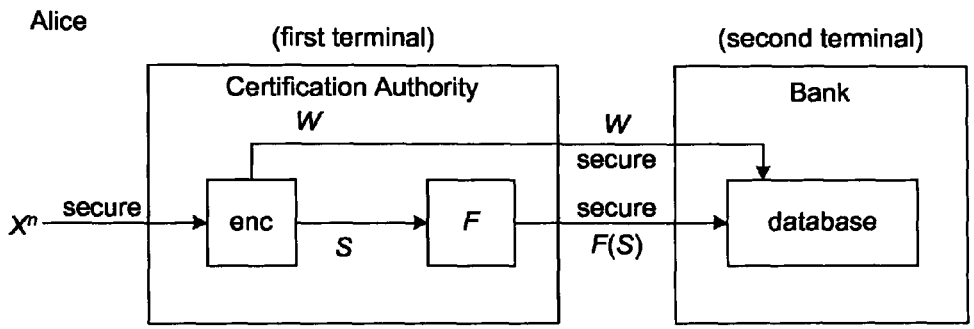
FIG. 1 shows a system for carrying out an enrolment process for a user.
Figure 2:
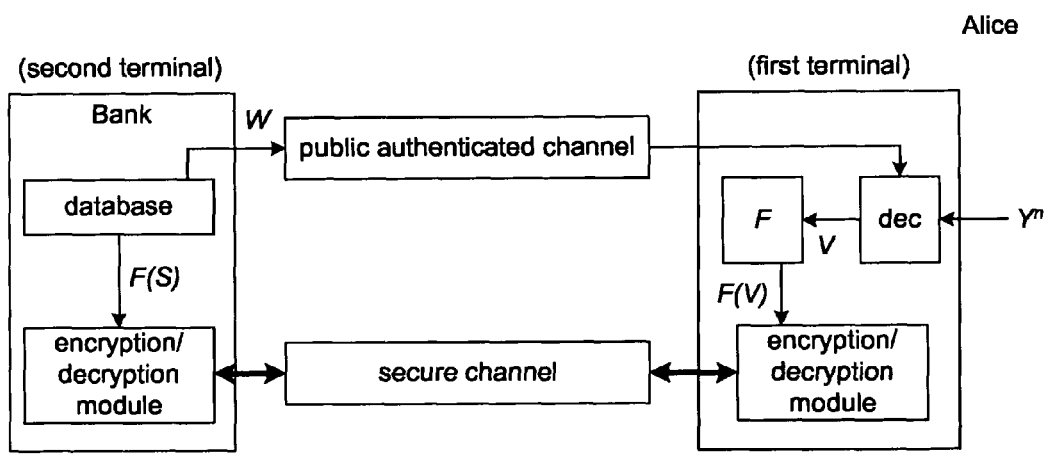
FIG. 2 shows a system for carrying out an application process for a user.
Figure 3:
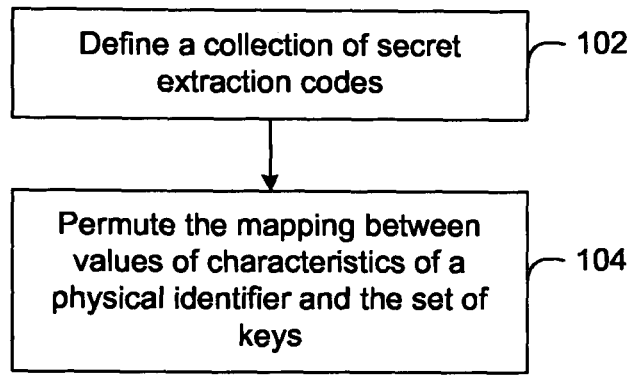
FIG. 3 is a flow chart showing the method of generating a cryptographic key in accordance with the invention.

FIG. 3 is a flow chart showing a method of expanding the set of secret extraction codes in accordance with the invention.

In step 102, a collection of secret extraction codes is defined. The collection may comprise one or more secret extraction codes. Each secret extraction code defines a mapping between sets of values of characteristics of a physical identifier and a set of keys. That is, based on the measured values of the characteristics, the measurement is assigned to one of multiple regions. The regions may be such that all measurements within a region are similar to each other, or may be such that each region includes disparate measurements. Given the assigned region, a selected secret extraction code then defines a particular key from the set of available keys.

In step 104, the collection of secret extraction codes is expanded by permuting the mapping between the sets of values of the characteristics of the physical identifier and the set of keys. In a preferred embodiment of the invention, the permutation is a cyclic permutation, as will be described in more detail below. In alternative embodiments of the invention, the permutation is a non-cyclic permutation.

Figure 4:
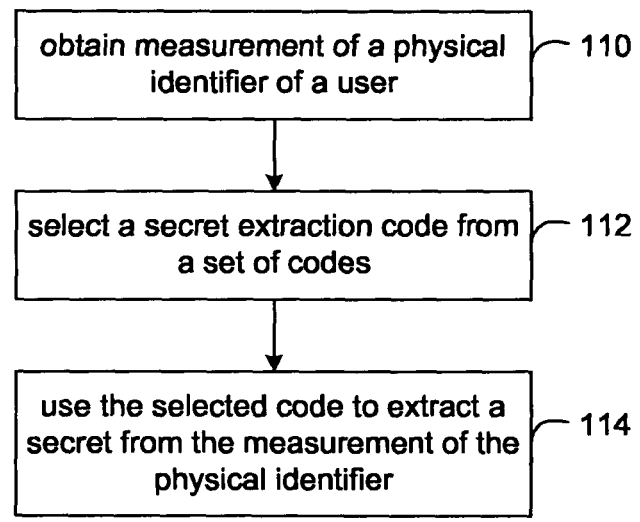
FIG. 4 is a flow chart showing the method of expanding the set of secret extraction codes in accordance with the invention.

FIG. 4 is a flow chart showing the method of generating a cryptographic key for encrypting communications between first and second terminals using the expanded set of secret extraction codes in accordance with the invention. The method is applicable to both the enrolment phase and the application phase.

In step 110, a measurement is taken of characteristics of a physical identifier of a user.

As described above, when this measurement is made during the application phase, the measurement will be noisy, meaning that it will not exactly match the measurement taken by the certification authority during enrolment.

In step 112, a secret extraction code is selected from a collection of codes. In accordance with the invention described above, at least one of the codes in the collection has a mapping between values of the characteristics of the physical identifier and the set of keys that is a cyclic permutation of the ordered mapping of one of the other codes in the collection.

In the enrolment phase, that is, when a user first establishes a key for encrypting communications with another specific user, the certification authority randomly selects one of the secret extraction codes from the collection. In the application phase, when the user wishes to communicate with another specific user, the first terminal selects the appropriate secret extraction code using helper data that was generated by the certification authority at the time of enrolment. The helper data is generated by the certification authority and is stored in a memory of the second terminal.

In step 114, the selected secret extraction code is used to extract a key from the measurement of the characteristics of the physical identifier. A one-way function is normally used to generate the encryption key from the extracted key. In the enrolment phase, the certification authority sends the encryption key to the second terminal, where it is stored in a memory.

In the application phase, the generated encryption key is used to encrypt communications to be sent to, and to decrypt communications received from, the second terminal.

As mentioned above, a permutation process is used in order to generate additional secret extraction codes from a first secret extraction code. As an example of the permutation used in accordance with the invention, let X be a permutation on $S=\{1, 2, \ldots, |S|\}$, i.e. $\pi: S \mapsto S$, and let $C=\{(\epsilon_i, D_i)\}_{i=1}^{|S|} \in C$. A new secret extraction code, $C_\pi$, is defined as $$C_\pi = \{(\epsilon_{\pi(i)}, D_{\pi(i)})\}_{i=1}^{|S|}. \tag{6}$$

Let $\Pi \subseteq \{\pi: S \mapsto S\}$ be a subset of permutations on S. A new collection Ch of secret extraction codes is constructed as $$C_\Pi = \{C_\pi : C \in C, \pi \in \Pi\} \tag{7}$$

In a preferred embodiment of the present invention, the following construction of the set of permutations is used. The set of permutations is the set of all cyclic shifts on S, i.e.

$$\Pi_{CS} = \{\pi_k : k \in S, \pi_k : S \mapsto S, \pi_k(i) = i + k (\mathrm{mod}|S|)\} \tag{8}$$

Thus, if, in a basic secret extraction code, measurements in a first region are mapped to a first key, measurements in a second region are mapped to a second key, and so on; then, in a first permutation, measurements in a first region are mapped to the second key, measurements in a second region are mapped to a third key, and so on, until measurements in a final region are mapped to the first key. Further, in a second permutation, measurements in a first region are mapped to the third key, measurements in a second region are mapped to a fourth key, and so on, until measurements in the final region are mapped to the second key. The number of available permutations is thus equal to the number of regions and keys.

The extended collection of codes $C_{CS}$ is defined by $$C_{CS} = \{C_\pi : C \in C, \pi \in \Pi_{CS}\} \tag{9}$$

This construction meets the requirements set out in the Background section. For example, let $x^n \in X^n$, such that given the original collection C of secret extraction codes, $\Phi_{x^n} = \{C\}$. Without imposing restrictions, it is assumed that $$x^n, C \to F(S) \tag{10}$$

For the new collection $C_{CS}$, define $$x^n, C_{\pi_k} \to F(S_k) \tag{11}$$

It follows from Equations 8 and 9 that, $$F(S_k) = F(S + k (\mathrm{mod}|S|)). \tag{12}$$

Formulate requirement 4 of the introduction as follows $$F, F(S), k \not\mapsto F(S + k (\mathrm{mod}|s|)). \tag{13}$$

Given a complete description of the one-way function F, the value of $F(S)$ (with S unknown) and $k \in \{1, 2, \ldots, |S|\}$, an attacker should not be able to derive the value of $F(S + k (\mathrm{mod} |S|))$.

The requirement of Equation 13 imposes requirements on the one-way function F. For example, F cannot be homomorphic, i.e. $F(\alpha + \beta) = F(\alpha)F(\beta)$, otherwise an attacker will be able to calculate $F(S)$ efficiently.

One-way functions that are not vulnerable to the above-mentioned attack include, for example, SHA-1, or one-way functions derived from block ciphers.

If $E_K$ is a block cipher (e.g. LOMBOK or DES) using a fixed publicly known key K, one-way function F can be constructed as $$F(S) = E_K(S) \oplus S. \tag{14}$$

Finally note that the only requirement imposed on the one-way function F is one-wayness (or pre-image resistance). One-wayness ensures that, given $F(S)$, an attacker is not able to find a value V (which possibly equals S) such that $F(V) = F(S)$. In addition, collision resistance is not required.

It will be appreciated that the word "comprising" does not exclude other elements or steps, that "a" or "an" does not exclude a plurality, and that a single processor or other unit may fulfill the functions of several means recited in the claims. Furthermore, the presence of reference signs in the claims shall not be construed as limiting the scope of the claims.

The invention claimed is:

1. A method of generating encryption keys for encrypting communications between terminals including a first terminal and a second terminal, the acts of:
    obtaining a measurement of characteristics of a physical identifier of a user; extracting a first key from the physical identifier using a first code selected from a collection of codes, each code in the collection defining an ordered mapping from regions including a set of values of the characteristics to a set of keys;
    wherein the collection of codes comprises at least one code in which the ordered mapping is a permutation of the ordered mapping of one of the other codes in the collection for mapping from a particular set of values of characteristics of the physical identifier to a particular key;
    generating a first encryption key from the first key for encrypting the communications between the first terminal and the second terminal;
    extending the collection of codes by adding permuted versions of the codes including the permutation of the ordered mapping of one of the other codes;
    extracting a second key from the physical identifier using a second code, wherein the second code is one of the permuted versions of the codes; and
    generating a second encryption key from the second key for encrypting the communications between the first terminal and a further terminal, and
    wherein a number of available permutations is equal to a number of the regions and a number of the keys.

2. A method as claimed in claim 1, wherein the permutation is a cyclic permutation.

3. A method as claimed in claim 1, wherein the permutation is a non-cyclic permutation.

4. A method as claimed in claim 1, the method further comprising performing a one-way function on the extracted key.

5. A method as claimed in claim 1, wherein the first terminal is part of a certification authority.

6. A method as claimed n claim 5, wherein the method r the first terminal comprises randomly selecting the code from the collection.

7. A method as claimed in claim 5, wherein the method in the first terminal further comprises deriving helper data for identifying the code used to extract the key from the measurement of the characteristics of the physical identifier.

8. A method as claimed in claim 7, the method further comprising storing said helper data and the extracted key in a memory of the second terminal.

9. A method as claimed in of claim 1, wherein the first terminal is a user terminal and the code is selected from the collection of codes on the basis of helper data provided to the first terminal by the second terminal.

10. A method as claimed in of claim 1, wherein physical identifier is a biometric identifier.

11. The method of claim 1, wherein the extracting includes:
    mapping measurements in a first region of regions to a first key, wherein the regions comprise sets of values of the characteristics of the physical identifier: and
    mapping measurements in a second region of the regions to a second key,
    wherein, in a first permutation, the measurements in the first region are mapped to the second key, measurements in the second region are mapped to a third key, until measurements in a final region are mapped to the first key.

12. The method of claim 11 wherein, in a second permutation, the measurements in the first region are mapped to the third key, the measurements in a second region are mapped to a fourth key, until measurements in the final region are mapped to the second key.

13. The method of claim 1, wherein in the collection of codes first measurements of the characteristics of the physical identifier of the user in a first region of regions are mapped to a first key, and second measurements of the characteristics in a second region of the regions are mapped to a second key, until measurements in the final region are mapped to a final key,
    wherein in a first permuted version of the permuted versions of the codes, the first measurements are mapped to the second key, the second measurements are mapped to a third key, until measurements in the final region are mapped to the first key, and
    wherein in a second permuted version of the permuted versions of the codes, the first measurements are mapped to a third key, the second measurements are mapped to a fourth key, until measurements in the final region are mapped to the second key.

* * * * *